(12) United States Patent
Kogo (10) Patent No.: US 11,808,593 B2
(45) Date of Patent: Nov. 7, 2023

(54) CHARGING DEVICE SEARCHING SYSTEM, COMMUNICATION TERMINAL, AND SERVER DEVICE

(71) Applicant: Yazaki Corporation, Tokyo (JP)

(72) Inventor: Kosuke Kogo, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 249 days.

(21) Appl. No.: 17/462,977

(22) Filed: Aug. 31, 2021

(65) Prior Publication Data

US 2021/0396535 A1 Dec. 23, 2021

Related U.S. Application Data

(63) Continuation of application No. PCT/JP2020/015391, filed on Apr. 3, 2020.

(30) Foreign Application Priority Data

Apr. 5, 2019 (JP) ................................. 2019-072711

(51) Int. Cl.
*B60L 53/66* (2019.01)
*G01C 21/34* (2006.01)
*G01C 21/36* (2006.01)

(52) U.S. Cl.
CPC .......... *G01C 21/3469* (2013.01); *B60L 53/66* (2019.02); *G01C 21/362* (2013.01)

(58) Field of Classification Search
CPC ... G01C 21/3469; G01C 21/362; B60L 53/66; B60L 53/68; Y04S 30/12; G06Q 10/02; G08G 1/005

USPC .......................................................... 701/533
See application file for complete search history.

(56) References Cited

U.S. PATENT DOCUMENTS

| 8,452,642 B2 * | 5/2013 | Matsuyama | G06Q 50/06 |
| | | | 705/13 |
| 8,698,642 B2 * | 4/2014 | Taguchi | B60L 3/12 |
| | | | 340/636.11 |
| 8,717,170 B1 * | 5/2014 | Juhasz | B60L 53/63 |
| | | | 340/5.2 |

(Continued)

FOREIGN PATENT DOCUMENTS

| CN | 109029477 A | 12/2018 | |
| EP | 2587338 A2 * | 5/2013 | ............. G06F 1/266 |

(Continued)

*Primary Examiner* — Jaime Figueroa
(74) *Attorney, Agent, or Firm* — Sughrue Mion, PLLC (57) ABSTRACT

A charging device searching system for an electrically driven vehicle, includes a point of destination inputting unit to input an information indicative of a point of destination and a searching unit to set an area around the point of destination for which the information has been input by the point of destination inputting unit as a search area and to search for the standard charging device in the set search area. The searching unit is, when a point of destination for which the information has been input by the point of destination inputting unit is within a predetermined area, to set a surrounding area of a transfer point at which a mode of transportation is switched from the electrically driven vehicle to another transportation to reach the point of destination, as the search area and to search for the standard charging device in the set search area.

5 Claims, 11 Drawing Sheets (56) References Cited

U.S. PATENT DOCUMENTS

| | | | | |
|---|---|---|---|---|
| 8,774,995 | B2* | 7/2014 | Ishibashi | B60L 58/12 191/11 |
| 8,781,675 | B2* | 7/2014 | Yoshida | G07C 5/085 701/1 |
| 8,825,354 | B2* | 9/2014 | Horita | G01C 21/3469 701/118 |
| 9,045,053 | B2* | 6/2015 | Ishibashi | B60L 53/00 |
| 9,170,118 | B2* | 10/2015 | Kiyama | B60L 53/65 |
| 9,189,900 | B1* | 11/2015 | Penilla | B60L 53/80 |
| 9,573,482 | B2* | 2/2017 | Ishibashi | B60L 53/65 |
| 10,324,463 | B1* | 6/2019 | Konrardy | G05D 1/0278 |
| 10,710,467 | B2* | 7/2020 | Sawada | H02J 7/342 |
| 11,340,083 | B2* | 5/2022 | Wilding | H04W 4/024 |
| 11,379,899 | B2* | 7/2022 | Toya | G06Q 30/0645 |
| 11,397,998 | B2* | 7/2022 | Lin | B60L 58/12 |
| 2003/0015874 | A1* | 1/2003 | Abe | B60W 20/12 290/40 C |
| 2003/0023376 | A1* | 1/2003 | Fujimoto | G01C 21/3682 340/990 |
| 2008/0243331 | A1* | 10/2008 | Kato | B60L 50/61 701/29.5 |
| 2010/0106401 | A1* | 4/2010 | Naito | B60L 53/00 701/533 |
| 2011/0032110 | A1* | 2/2011 | Taguchi | B60L 3/12 340/636.1 |
| 2011/0191266 | A1* | 8/2011 | Matsuyama | G06Q 50/06 705/412 |
| 2011/0193522 | A1* | 8/2011 | Uesugi | B60L 53/65 320/109 |
| 2011/0202219 | A1* | 8/2011 | Ishibashi | B60L 53/14 701/22 |
| 2011/0238287 | A1* | 9/2011 | Hayashi | G01C 21/3682 701/532 |
| 2011/0246061 | A1* | 10/2011 | Hayashi | G01C 21/3469 701/533 |
| 2012/0158229 | A1* | 6/2012 | Schaefer | G01C 21/3469 320/109 |
| 2012/0173061 | A1* | 7/2012 | Hanley | B60L 53/14 180/65.21 |
| 2013/0035823 | A1* | 2/2013 | Yoshida | G07C 5/085 701/302 |
| 2013/0119920 | A1* | 5/2013 | Hsu | B60L 53/665 320/109 |
| 2013/0226441 | A1* | 8/2013 | Horita | B60Q 9/00 701/117 |
| 2013/0261953 | A1* | 10/2013 | Kiyama | G01C 21/3469 701/400 |
| 2013/0339072 | A1* | 12/2013 | Touge | G06Q 10/00 705/5 |
| 2014/0163877 | A1* | 6/2014 | Kiyama | G01C 21/3469 701/533 |
| 2014/0229050 | A1* | 8/2014 | Ishibashi | B60L 53/68 701/22 |
| 2015/0231983 | A1* | 8/2015 | Ishibashi | B60L 58/12 701/22 |
| 2015/0286965 | A1* | 10/2015 | Amano | B60L 53/68 705/5 |
| 2016/0026186 | A1* | 1/2016 | Kazama | G05D 1/0274 701/24 |
| 2016/0059729 | A1* | 3/2016 | Ishibashi | G01C 21/3469 701/22 |
| 2016/0283999 | A1* | 9/2016 | Toya | G06Q 30/0639 |
| 2017/0010116 | A1* | 1/2017 | Inoue | B60Q 53/67 |
| 2017/0264364 | A1* | 9/2017 | Aoyama | H04B 10/1141 |
| 2019/0143828 | A1* | 5/2019 | Sawada | G06Q 10/02 340/934 |
| 2019/0202315 | A1* | 7/2019 | Wilding | G01C 21/3407 |
| 2019/0272600 | A1* | 9/2019 | Lin | B60L 53/68 |
| 2019/0351783 | A1* | 11/2019 | Goei | B60L 53/63 |
| 2020/0003571 | A1* | 1/2020 | Shirakawa | G06Q 10/02 |

FOREIGN PATENT DOCUMENTS

| | | |
|---|---|---|
| JP | 2002-354609 A | 12/2002 |
| JP | 2005-165809 A | 6/2005 |
| JP | 2005-182146 A | 7/2005 |
| JP | 2011-107929 A | 6/2011 |
| JP | 2011-252754 A | 12/2011 |
| JP | 2012-182879 A | 9/2012 |
| JP | 2018-170823 A | 11/2018 |
| WO | 2009/096021 A1 | 8/2009 |
| WO | 2010/119509 A1 | 10/2010 |

* cited by examiner

| CHARGING DEVICE A 4/21 (SAT.) | | |
|---|---|---|
| AM | ☐ 9:00~10:00 (BOOKING UNAVAILABLE) | |
| | ☐ 10:00~11:00 (BOOKING UNAVAILABLE) | |
| | ☐ 11:00~12:00 (BOOKING UNAVAILABLE) | |
| PM | ☑ 12:00~13:00 (BOOKING AVAILABLE) | |
| | ☑ 13:00~14:00 (BOOKING AVAILABLE) | |
| | ☐ 14:00~15:00 (BOOKING AVAILABLE) | |
| | ☐ 15:00~16:00 (BOOKING AVAILABLE) | |
| | ☐ 16:00~17:00 (BOOKING AVAILABLE) | |
| NIGHT | ☐ 17:00~18:00 (BOOKING UNAVAILABLE) | |
| | ☐ 18:00~19:00 (BOOKING UNAVAILABLE) | |

BOOKING   RETURN

FIG. 11

CHARGING DEVICE SEARCHING SYSTEM, COMMUNICATION TERMINAL, AND SERVER DEVICE

CROSS-REFERENCE TO RELATED APPLICATION

The present application is a continuation application of PCT/JP20201015391 that claims priority to Japanese Patent Application No. 2019-072711 filed on Apr. 5, 2019 and, the entire content of which is incorporated herein by reference.

TECHNICAL FIELD

The present invention relates to a charging device searching system configured to search for a standard charging device which carries out standard charging for a battery mounted on an electrically driven vehicle, a communication terminal configured to be used for the charging device searching system, and a server device.

BACKGROUND

Electrically driven vehicles equipped with batteries include electric vehicles, hybrid vehicles, electrically driven bicycles, electrically driven wheelchairs and so on. One of the issues confronting the spread of electrically driven vehicles (especially electric vehicles) is a concern that in case where there are not enough charging stations available, it will not be possible to charge a battery when the battery runs out when one goes out.

Therefore, an information management device has been proposed for permitting others to use a charging device installed in a private individual's house while the owner does not use it (Patent Literature 1: JP2011-107929A). When the information management device of Patent Literature 1 receives a charging requirement transmitted from a terminal of a person who wants to charge, the information management device searches for a charging device which satisfies the requirement. The requirement includes a usage time during which the person wants to use the charging device, and when the usage time is a current time, an area around a current location is set as a charging place. When the usage tune is not immediate, an area around a place where the vehicle will be running nearby at around the usage time is to be set as the charging place.

In addition, Patent Literatures 2 to 4 (Patent Literature 2: JP2002-354609A, Patent Literature 3: JP2012-182879A, Patent Literature 4: JP2018-170823A) can be mentioned as techniques related to the charging device searching system described above.

In the related an described above, since the requirement includes the usage time correlated with the charging place, it is premised that a charging requirement is transmitted when the person (user) wants to charge while driving. However, at present, the number of charging devices which can perform quick charging is very small. In particular, private individuals' houses are often equipped with standard charging devices and quick charging devices are rarely installed. This meant that a user had to wait for hours without doing anything until the battery is charged, even when the user arrive at the place where the searched charging device is located on the usage time. Therefore, there is a problem that the related art has not been suitable for searching for a standard charging device which performs standard charging.

The invention is made in view of the circumstances described above and an object of the invention is to provide a charging device searching system, a communication terminal, and a server device that are suitable fir searching for a standard charging device which performs standard charging.

SUMMARY

In order to achieve the object described above, a charging device searching system, a communication terminal, and a server device according to the invention are characterized by the followings [1] to [5].

[1] A charging device searching system is configured to search for a standard charging device configured to perform a standard charging for a battery mounted on an electrically driven vehicle, the charging device searching system includes a point of destination inputting unit into which a point of destination is to be input and a searching unit configured to set an area around the point of destination input by the point of destination inputting unit as a search area and to search for the standard charging device in the set search area.

[2] The charging device searching system according to [1] includes a booking inputting unit into which a booking request, a usage start time and a usage end time of the standard charging device searched by the searching unit are input and a booking unit configured to book the standard charging device for which the booking request has been input, for a time period between the usage start time and the usage end time.

[3] In the charging device searching system according to [1] or [2], the searching unit is configured, when a point of destination input by the point of destination inputting unit is within a predetermined area, to set a surrounding area of a transfer point at which a mode of transportation is switched from the electrically driven vehicle to another transportation to reach the point of destination as the search area and to search for the standard charging device in the set search area.

[4] communication terminal is configured to search for a standard charging device configured to perform a standard charging of a battery mounted on an electrically driven vehicle, the communication terminal including a point of destination inputting unit into which a point of destination is to be input, a point of destination transmission unit configured to transmit the point of destination input by the point of destination inputting unit to a server device, and a search result receiving unit configured to receive a search result of the standard charging device around the point of destination from the server device.

[5] A server device is configured to search for a standard charging device configured to perform a standard charging for a battery mounted on an electrically driven vehicle, the server device including a point of destination receiving unit configured to receive an information on a point of destination from a communication terminal, a searching unit configured to: set an area around the point of destination for which the information has been received by the point of destination receiving unit as a search area; and to search for the standard charging device in the set search area and a search result transmitting unit configured to transmit a search result searched by the searching unit to the communication terminal.

With the charging device searching system, the communication terminal, and the server device having the configurations of [1], [4], and [5], since the standard charging device around the point of destination is searched, it is possible to perform charging while sightseeing, eating shopping, or the like at the point of destination.

With the charging device searching system having the configuration of [2], it is possible to specify the usage start time and the usage end time of booking. Since the standard charging device has a long charging time, it is possible to avoid the situation where the searched standard charging device cannot be used by adopting a time-specified booking system.

With the charging device searching system having the configuration of [3], it is possible to guide the transfer point with the transportation in a predetermined area where the transportation is well developed.

According to the invention, since a standard charging device around a point of destination is searched, it is possible to perform charging while sightseeing, eating, shopping, or the like at the point of destination. This makes it possible to provide a charging device searching system suitable for searching for a charging device which performs normal charging.

The invention is briefly described above. Further, the details of the invention will be further clarified by reading through the description of embodiments described below (hereinafter referred to as "embodiments") with reference to the accompanying drawings.

DESCRIPTION OF EMBODIMENTS

Specific embodiments of the invention will be described below with reference to the respective drawings.

A charging device for charging a battery mounted on an electrically driven vehicle can be divided into a standard charging device and a quick charging device. The standard charging device uses single-phase 100 V or 200 V as a power source and takes a long time to charge, but can be easily installed in a general detached house, a condominium, or the like. Hereinafter, charging performed by the standard charging device will be referred to as "standard charging". On the other hand, the quick charging device uses three-phase 200 V as a power source and takes a short time to charge, but cannot be easily installed.

A charging device searching system 1 of the embodiment is a system for searching and booking a standard charging device among the above-described two types of charging devices. In the embodiment, an electric vehicle will be described as an example of the electrically driven vehicle, but the electrically driven vehicle may be a vehicle which travels by using a battery as a drive source and may be a hybrid vehicle, an electrically driven bicycle, or the like.

Figure 1:
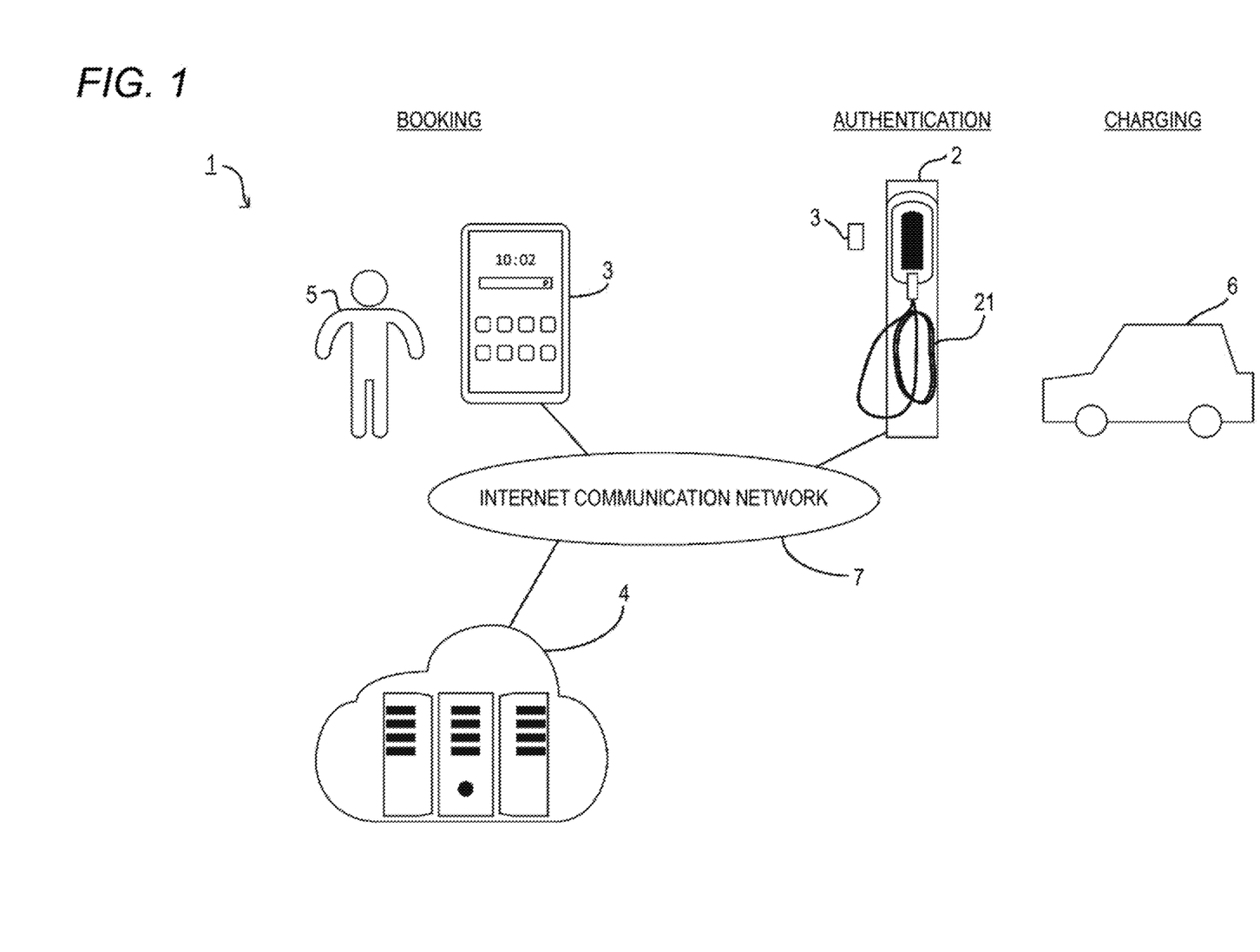
FIG. 1 is a configuration diagram illustrating an embodiment of a charging device searching system of the invention.

The charging device searching system 1 includes a plurality of standard charging devices 2 (hereinafter, simply abbreviated as "charging device 2") for standard charging, a communication terminal 3 owned by a user 5 who are to use these charging devices 2, and a server device 4 which executes searching, booking, or the like of the charging device 2 by communicating with the communication terminal 3. In the embodiment, the charging device 2, the communication terminal 3, and the server device 4 are configured to be able to communicate with each other via an Internet communication network 7. In addition, non-contact IC card technology is adopted for the communication terminal 3 and the server device 4 and the communication terminal 3 and the server device 4 are configured to perform wireless communication with each other without using the Internet communication network 7.

Each of the charging devices 2 is a standard charging device installed in a detached house, a store, or the like in various locations and registered in advance in a database (hereinafter, DB) 42 of the server device 4, which will be described below. In an example illustrated in FIG. 1, the charging device 2 is configured to charge an electrically driven vehicle 6 using a charging cord 21, but may also employ non-contact charging using electromagnetic induction. The charging device 2 executes authentication of the booked communication terminal 3, a billing process of transmitting billing information after the authentication to the server device 4, and the like.

Figure 2:
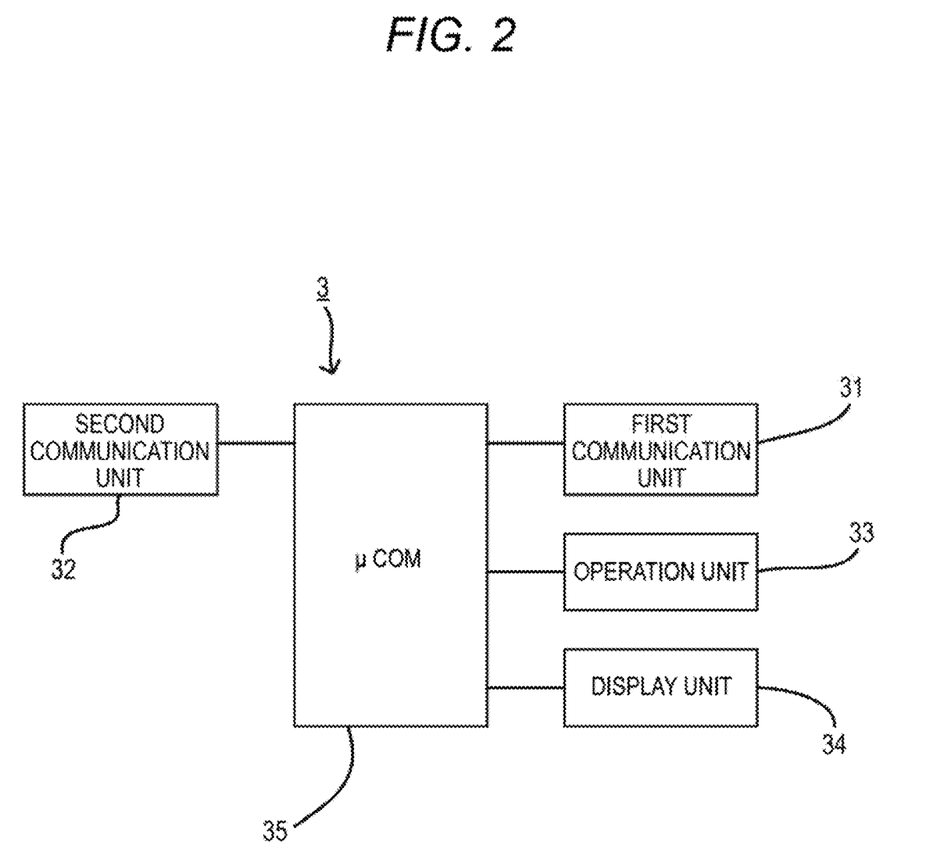
FIG. 2 is a configuration diagram of a communication terminal illustrated in FIG. 1.

The communication terminal 3 is for example a tablet or a smartphone. As illustrated in FIG. 2, the communication terminal 3 includes a first communication unit 31 configured to wirelessly connect the communication terminal 3 to the Internet communication network 7, a second communication unit 32 configured to perform wireless communication with the charging device 2, an operation unit 33 (point of destination input unit, booking input unit) with which various information input operations for booking are performed, a display unit 34 configured to display information transmitted from the server device 4, and a microcomputer (hereinafter referred to as µCOM) 35 configured to control the entirety of the communication terminal 3.

In the embodiment, an example in which the operation unit 33 and the display unit 34 include a touch panel in which these units are integrally formed will be described. The µCOM 35 of the communication terminal 3 is configured to function as first and third information presenting units and is configured to display (present) information on the changing device 2 searched by the server device 4 (information including information on surrounding areas). Further, the µCOM 35 is configured to function as second information presenting unit and is configured to display information on the booked charging device 2 (information including the booking date and time and information on surrounding areas).

Figure 3:
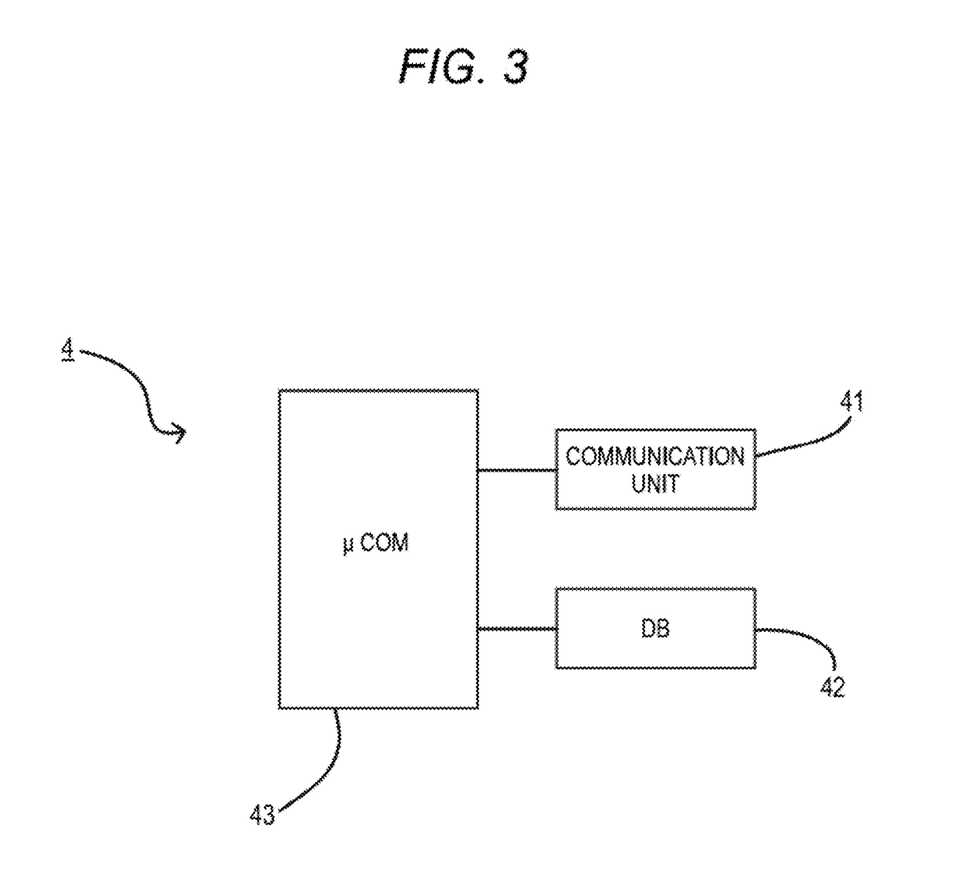
FIG. 3 is a configuration diagram of a server device illustrated in FIG. 1.

As illustrated in FIG. 3, the server device 4 includes a communication unit 41 configured to connect the server device 4 to the Internet communication network 7, the DB 42 which stores registration information (installation location, usage conditions, pass data, information on surrounding areas, and the like) and booking status of a plurality of charging devices 2, and a μCOM 43 configured to control the entirety of the server device 4. The μCOM 43 of the server device 4 is configured to function as a searching unit, to search for the charging device 2 from the DB 42 in response to the input from the communication terminal 3, and to transmit a search result to the communication terminal 3. The μCOM 43 is configured to function as a booking unit, to confirm the booking of the charging device 2 in response to the input from the communication terminal 3, and to transmit pass data to the communication terminal 3 to make the confirmed charging device 2 available.

Next, an operation of the charging device searching system 1 having the configuration described above will be described with reference to FIGS. 4 and 5. The charging device searching system 1 of the embodiment is an optimal system for a user 5 to go to a point of destination (particularly a remote place) and search for the charging device 2 which can perform charging while the user 5 enjoys sightseeing, eating, shopping, or the like. When the user 5 decides on a plan to go to the point of destination, the user operates the communication terminal 3 to open a booking application in order to book the charging device 2.

Figure 4:
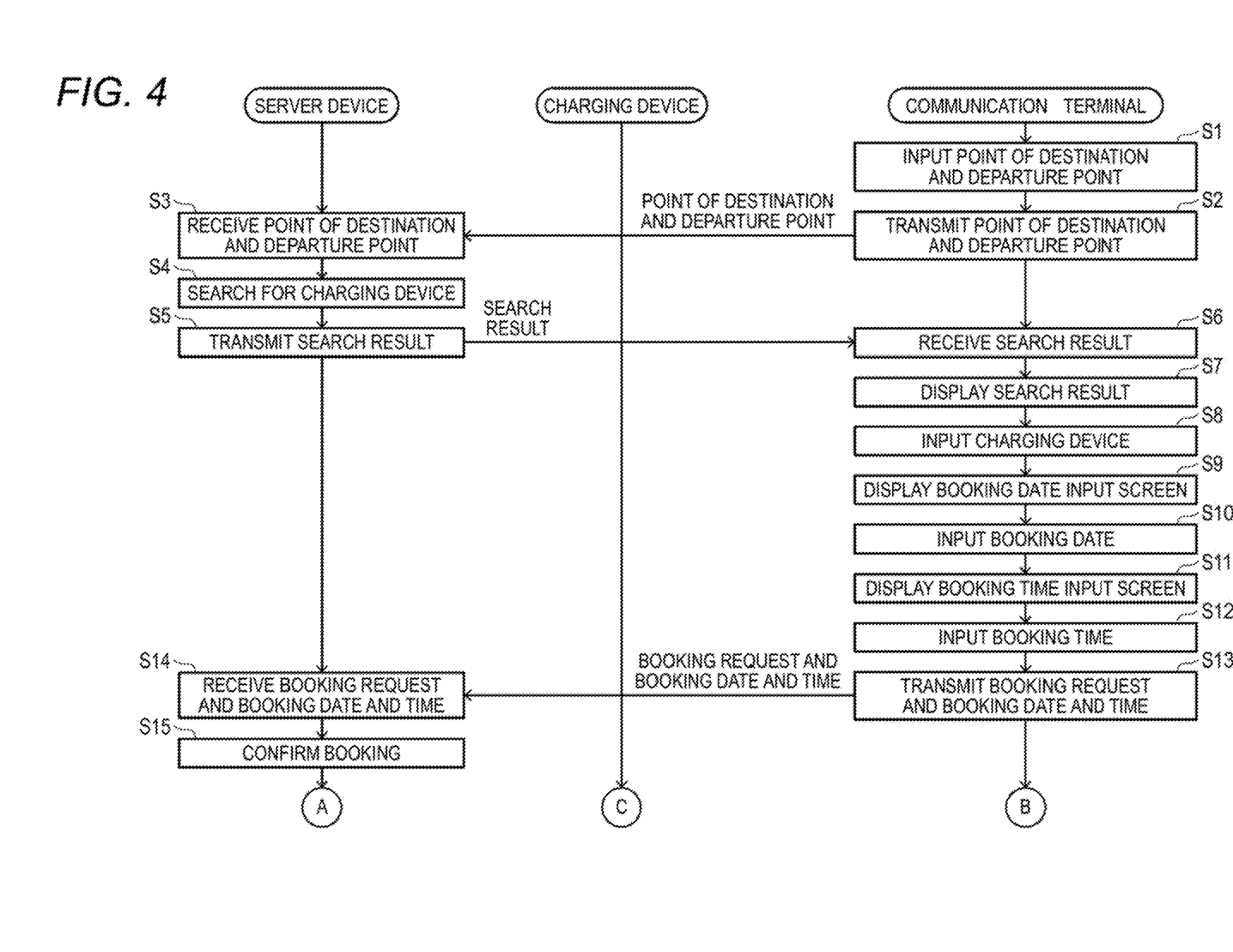
FIG. 4 is a communication sequence diagram for explaining an operation of the charging device searching system illustrated in FIG. 1.

In response to this, the μCOM 34 (hereinafter, simply abbreviated as communication terminal 3) of communication terminal 3 executes the booking application. When the booking application is executed on the communication terminal 3, a booking button and a booking checking button (not illustrated) are first displayed on the display unit 34. When the user 5 operates the hooking button, the communication terminal 3 displays a point of destination/departure point input screen on the display unit 34.

When the user 5 operates the operation unit 33 of communication terminal 3 and inputs an information indicative of the point of destination and departure point (S1), the communication terminal 3 controls the first communication unit which functions as a point of destination transmitting unit, and transmits the input information on the point of destination and departure point to the server device 4 (S2). When the communication unit 41 functioning as a point of destination receiving unit receives the information on the point of destination and departure point (S3), the μCOM 43 (hereinafter, simply abbreviated as server device 4) of the server device 4 searches for the charging device 2 from the DB 42 (S4).

Figure 6:
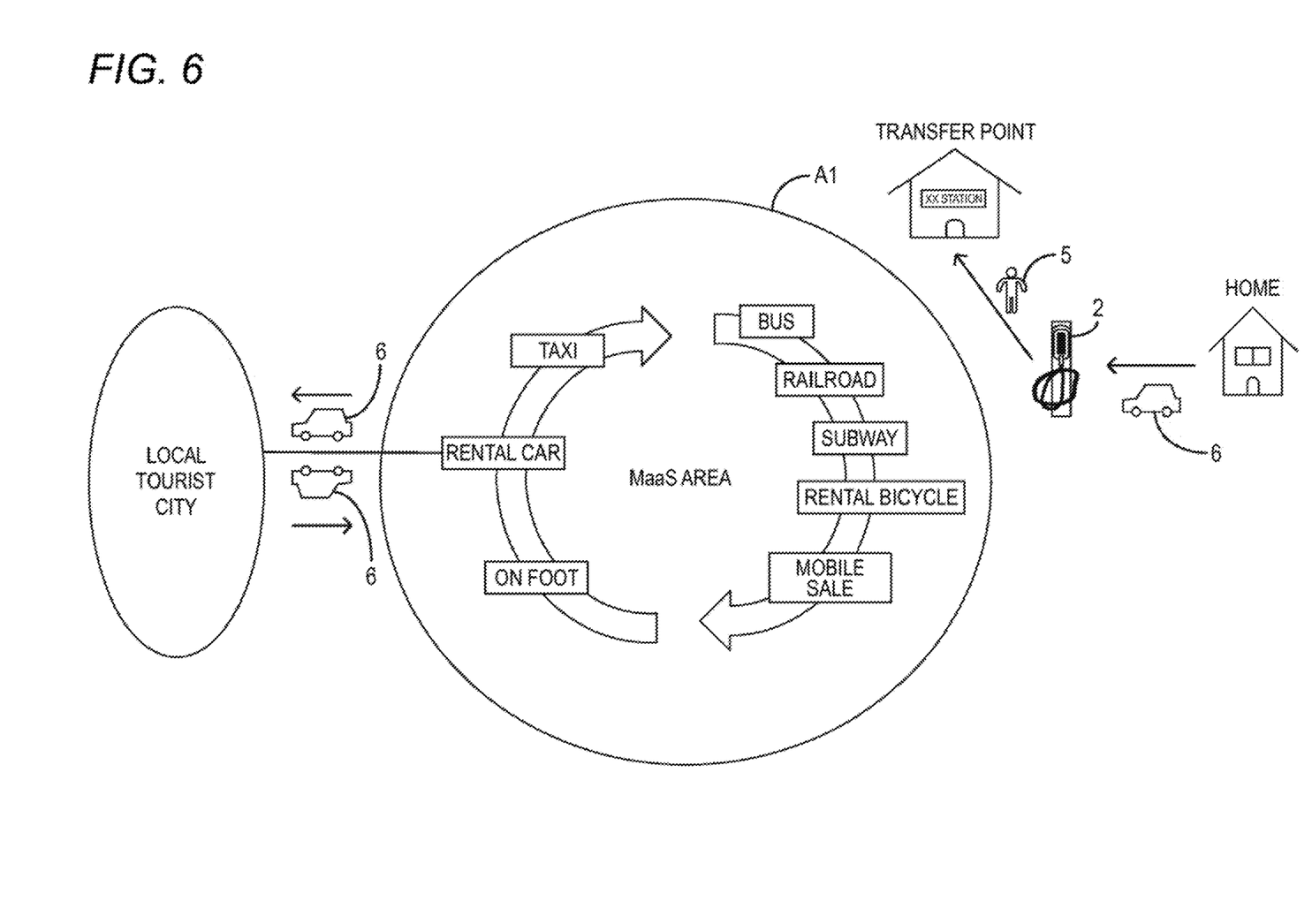
FIG. 6 is an explanatory diagram for explaining search for a charging device by the server device illustrated in FIG. 1.

At this point, the server device 4 determines whether or not the point of destination is within a MaaS (Mobility as a Service) area A1 (predetermined area) as shown in FIG. 6. The MaaS area A1 is an area registered in advance in the server device 4 as an area in which transportation system (bus, railroad, subway, and the like) is developed and few private cars run. When the server device 4 determines that the point of destination is within the MaaS area A1, the server device 4 determines a transfer point (for example, a train station) at which the user changes the mode of transport, for example from the electrically driven vehicle 6 owned by the user 5 to another mode of transport to be used to get to the point of destination. The transfer point can be obtained based on transportation related data and the information on the point of destination and departure point input by the user 5. The transfer point may be inside the MaaS area A1 or outside the MaaS area A1.

Next, the server device 4 sets an area around the transfer point (the area within a walking distance to the transfer point) as a search area and searches for the charging device 2 in the set search area. On the other hand, when the point of destination is outside the MaaS area A1, the server device 4 sets the area around the point of destination (the area within walking distance to the point of destination) as the search area and searches for the charging device 2 in the set search area.

As a result, as illustrated in FIG. 6, when the user 5 whose home is outside the MaaS area A1 has the point of destination inside the MaaS area A1, the user 5 can do the following. That is, the user 5 can move from his or her home to the charging device 2 around the transfer point (train station or the like) by his or her mire electrically driven vehicle 6, walk from the charging device 2 to the transfer point, and use another mode of transportation from the transfer point to the point of destination. Meanwhile, when the user 5 whose home is in the MaaS area A1 sets, for example, a local tourist city outside the MaaS area A1 as the point of destination, the user 5 can do the following. That, is, the user 5 can move to the charging device 2 around the point of destination by the electrically driven vehicle 6 such as a rental car and can walk to the point of destination from there.

Figure 7:
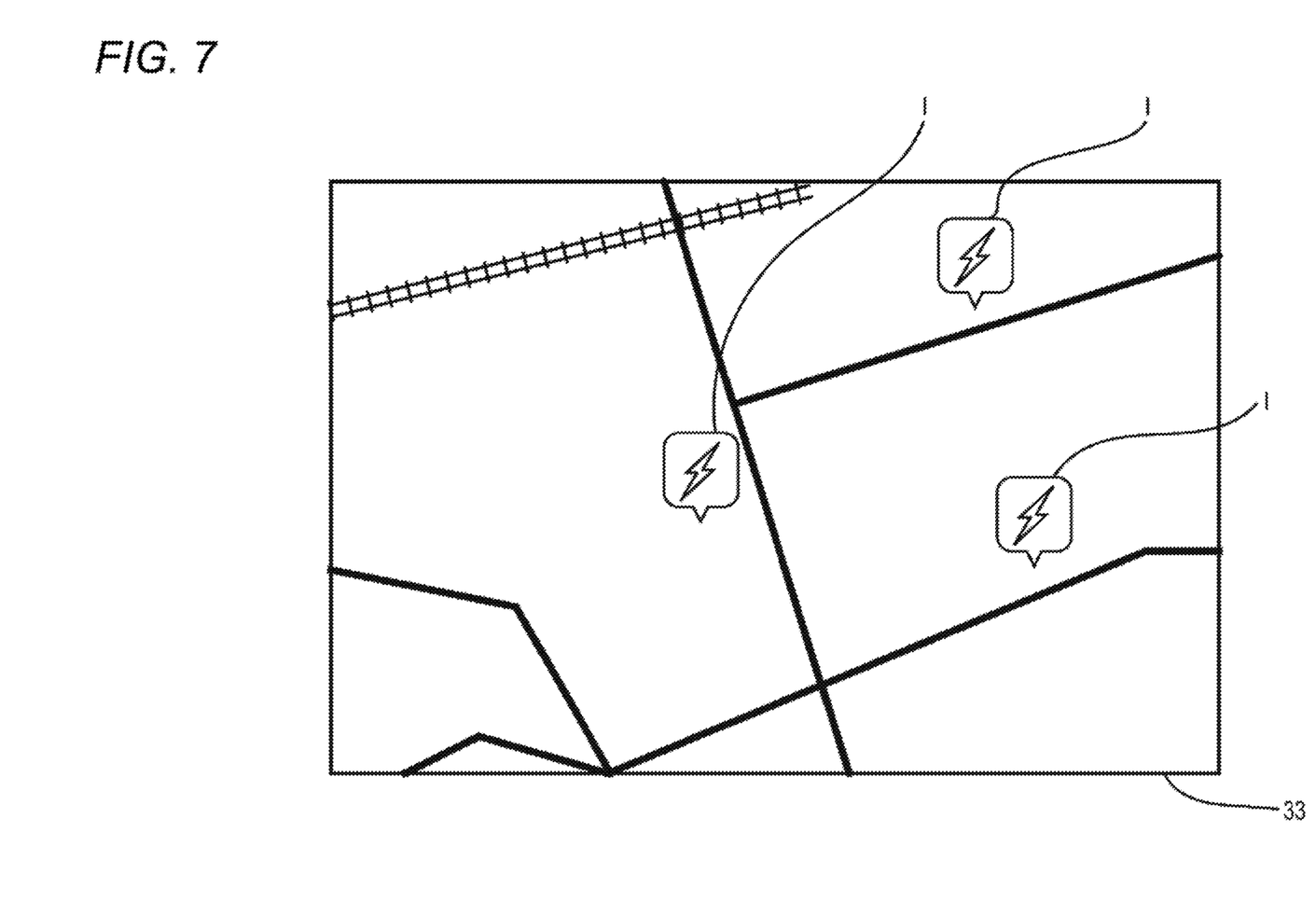
FIG. 7 is a diagram illustrating an example of a search result of the charging device displayed on a display unit of the communication terminal illustrated in FIG. 1.

Then, the server device 4 controls the communication unit 41 which functions as a search result transmitting unit and information transmitting unit and transmits the search result of the charging device 2 to the communication terminal 3 (S5). The search result of the charging device 2 includes information (location and booking status) of each searched charging device 2, information on surrounding areas of each charging device 2, and the like. When the first communication unit functioning as the search result receiving unit and the information receiving unit receives the search result of the charging device 2 (S6), the communication terminal 3 functions as first information presenting unit and displays the search result on the display unit 34 (S7). As a display example of the search result, as illustrated in FIG. 7, it is conceivable to display an icon I indicating the searched charging device 2 on a map. Further, when the charging device 2 is searched around the point of destination, an icon indicating the point of destination may be displayed on the map. When the charging device 2 is searched around the transfer point, an icon indicating the transfer point may be displayed on the map. Of course, a list of addresses of the searched charging device 2 may be displayed without displaying the map.

Figure 8:
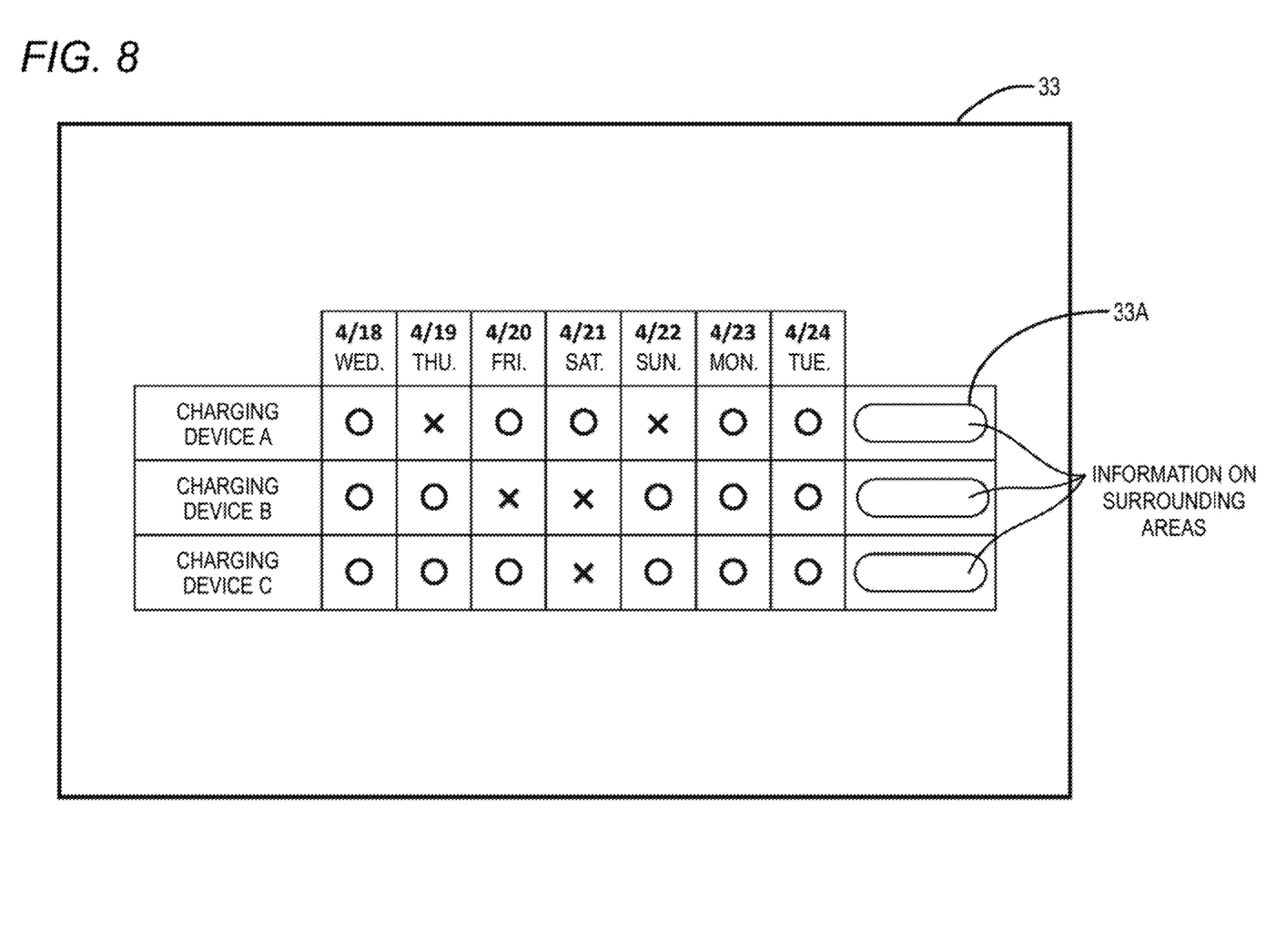
FIG. 8 is a diagram illustrating an example of a booking date input screen displayed on the display unit of the communication terminal illustrated in FIG. 1.

When the user 5 touches or clicks the icon I of the charging device 2 that the user wants to book, for example, in the communication terminal 3, the charging device 2 corresponding to the touched or clicked icon I is input as the charging device 2 to be booked (S8). When the charging device 2 is input (S8), the communication terminal 3 displays a booking date input screen illustrated in FIG. 8 based on a booking status received from the server device 4 (S9). The user 5 can input a plurality of charging devices 2 in S8 and proceed to the booking date input screen.

On the hooking date input screen, booking available dates of each charging device 2 (charging devices A to C in a display example of FIG. 8) input by the user 5 are displayed. In an example illustrated in FIG. 8, a table showing booking available dates and booking unavailable dates of each of the charging devices A to C for a time period of one week starting the present date (April 18$^{th}$) is displayed. "O" indicates the booking available dates and "X" indicates the booking unavailable dates, for example.

Further, on the booking date input screen, a surrounding areas information button 33A corresponding to each charging device 2 input by the user 5 is displayed. When the user 5 operates (touches or clicks) the surrounding areas information button 33A, the information on surrounding areas linked to the charging device 2 corresponding to the operated surrounding areas information button 33A is displayed. The information on surrounding areas includes information about nearby facilities. More specifically, the information on surrounding areas may include coupon information (discount coupon) available at nearby facilities, sale information, tourist information, and the like. Further, when the user 5 inputs (for example, touching or Clicking "O" in FIG. 8) the booking date of the charging device 2 to be booked (S10), the communication terminal 3 displays a booking time input screen illustrated in FIG. 9 (S11).

On the booking time input screen, a booking available time on the booking date (April 21$^{st}$ in the example illustrated in FIG. 9) of the charging device 2 (charging device A in an example illustrated in FIG. 9) input by the user 5 is displayed. In the example illustrated in FIG. 9, a table showing the booking available time and the booking unavailable time for each hour is displayed. "Booking Available" is displayed for the booking available time and "Booking Unavailable" is displayed for the hooking unavailable time, and further a check box is displayed for each time period.

Figure 9:
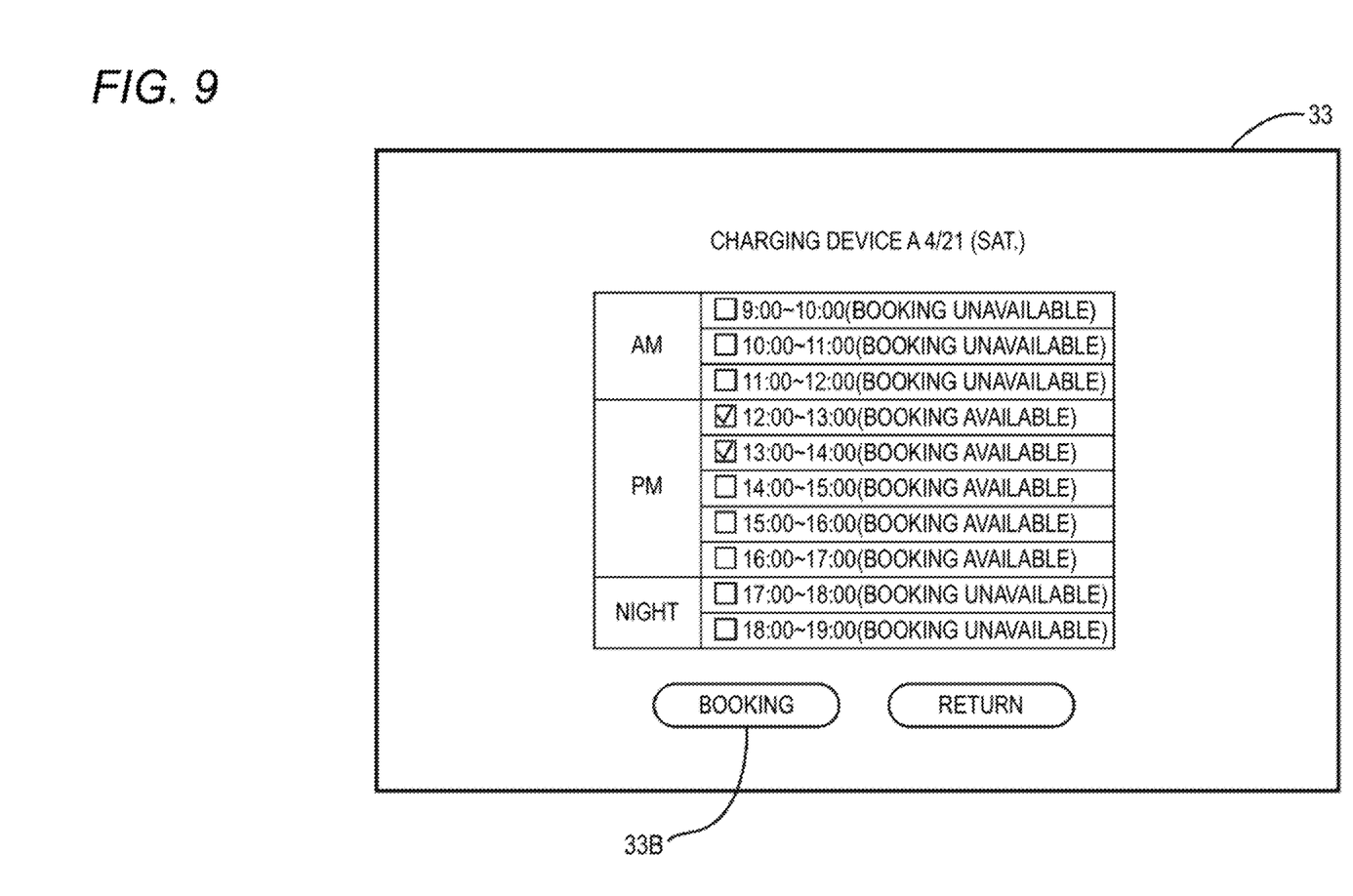
FIG. 9 is a diagram illustrating an example of a booking time input screen displayed on the display unit of the communication terminal illustrated in FIG. 1.

When the user 5 uses the operation unit 33 to check the check box of the time period in which "Booking Available" is displayed, a usage start time and a usage end time are input to the communication terminal 3 (S12). That is, when a user wants to input the usage start time as 12:00 and the usage end time as 14:00, the user may check the check box from 12:00 to 13:00 and the check box from 13:00 to 14:00. In addition, the check box of the time period for which "Booking Unavailable" is displayed cannot be checked.

Then, when the user presses a booking button 33B, the communication terminal 3 controls the first communication unit 31 which functions as booking transmitting unit and transmits the input booking request for the charging device 2 and the booking date and time (including the booking date, the usage start time, and the usage end time) to the server device 4 (S13).

When the communication unit 41 functioning as the booking receiving unit receives the booking request and the booking date and time (S14), the server device 4 confirms the booking (S15) and updates the booking status of each charging device 2 (that is, the booking is disabled from the usage start time to the usage end time of the charging device 2 whose booking has been confirmed). Then, the server device 4 transmits a booking confirmation notification including pass data to the communication terminal 3 of the charging device 2 for which the booking request has been made (S16). When the communication terminal 3 receives the booking confirmation notification including the pass data (S17), the communication terminal 3 displays the booking confirmation and saves the pass data (S18).

Figure 5:
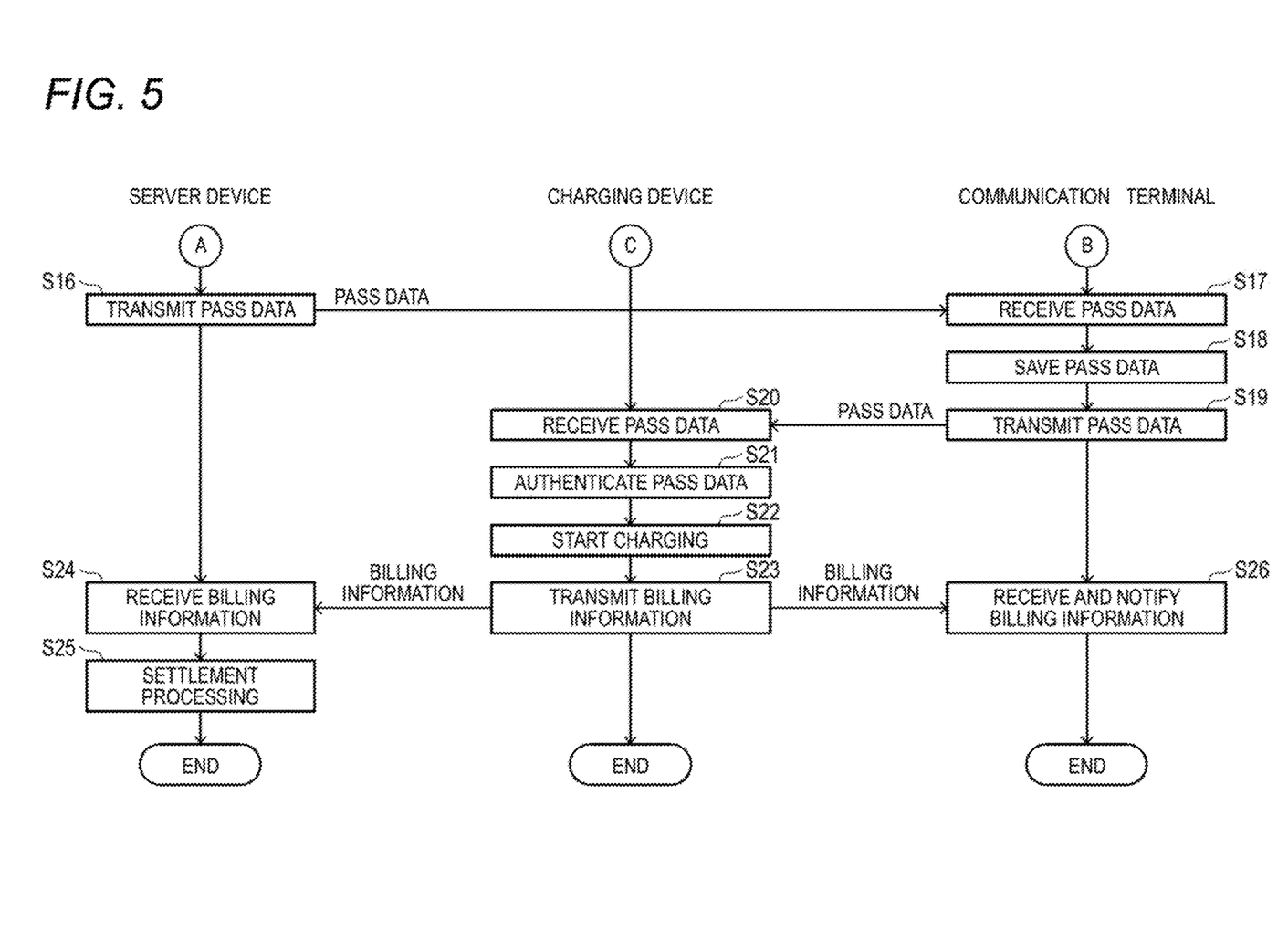
FIG. 5 is a communication sequence diagram showing a continuation of FIG. 4.

Then, the user 5 goes to the location of the booked charging device 2 on the booking date, transmits the pass data, and performs authentication (S19). When the charging device 2 receives the pass data (S20), the charging device 2 authenticates the pass data (S21). When the authentication is done, the charging device 2 starts charging (S22), and then the billing information is transmitted to the server device 4 and the communication terminal 3 of the user 5 who has made the booking (S23).

When the server device 4 receives the billing information (S24), the server device 4 performs settlement processing by credit card, electronic money, direct debit, or the like (S25) and ends the processing. Further, when the communication terminal 3 receives the billing information, the communication terminal 3 notifies the user 5 of the billing information (S26) and ends the process.

Meanwhile, when the user 5 operates the booking checking button when the booking application is opened, the communication terminal 3 displays the information (location, booking date and time, information on surrounding areas) of the charging device 2 for which a booking has been confirmed. As a result, the user 5 can check the location and booking date and time of the booked charging device 2. In addition, the user 5 can also use the coupon included in the information on surrounding areas.

According to the embodiment described above, since the standard charging device 2 around the point of destination is searched, the charging can be carried out while the user enjoys sightseeing, eating, shopping, or the like at the point of destination. This makes it possible to provide a charging device searching system suitable for searching for the charging device 2 which performs standard charging.

According to the embodiment described above, the usage start time and the usage end time can be specified for hooking. Since the standard charging device 2 takes a long to complete charging, it is possible to avoid the situation where the searched standard charging device 2 cannot be used as desired by adopting a time-specified booking system.

According to the embodiment described above, when the point of destination is in the Maas area A1, the standard charging device 2 around the transfer point is to be searched, so the transfer point to the transportation can be guided in the Maas area A1 where the transportation is well developed.

The invention is not limited to the embodiment described above and can be appropriately modified, improved, and the like. In addition, the material, shape, size, number, arrangement location, and the like of each component in the embodiment described above are arbitrary and are not limited as long as the invention can be achieved.

According to the embodiment described above, when the point of destination is the Maas area A1, the charging device 2 around the transfer point is searched, but the invention is not limited to this. The charging device 2 only around the point of destination may be searched without setting the Maas area A1. In this case, only the point of destination needs to be transmitted from the communication terminal 3 to the server device 4 and it is not necessary to transmit the departure point.

Further, according to the embodiment described above, the server device 4 searches for the charging device 2 around the point of destination and the transfer point and does not search for the charging device 2 around the route from the departure point to the point of destination. Therefore, when the search area can be selected from areas around the point of destination and the transfer point and areas around the route connecting the departure point and the point of destination and when the user selects the latter, the server device 4 may search for the charging device 2 around the route connecting the departure point to the point of destination.

Further, according to the embodiment described above, when the user 5 inputs the point of destination on the point of destination input screen, for example, as illustrated in FIG. 7, the locations of the charging devices 2 linked to the point of destination is displayed and a charging device 2 can be booked among those displayed, but the invention is not limited to this. For example, when the user 5 opens the application and operates the booking button, the locations of the charging devices 2 may be displayed on a map of a wide area such as Kanto region. In this case, the user 5 scrolls and zooms in and out the map displayed on the display unit 34 to display the map which has the point of destination on its center and selects a charging device 2 displayed in the map, in such a manner that the booking may be performed. That is, every time the user 5 scrolls and zooms in and out the map, the point of destination is input or changed, and then the server device 4 searches for the charging device 2 in the input or changed point of destination and transmits it to the communication terminal 3.

Figure 10:
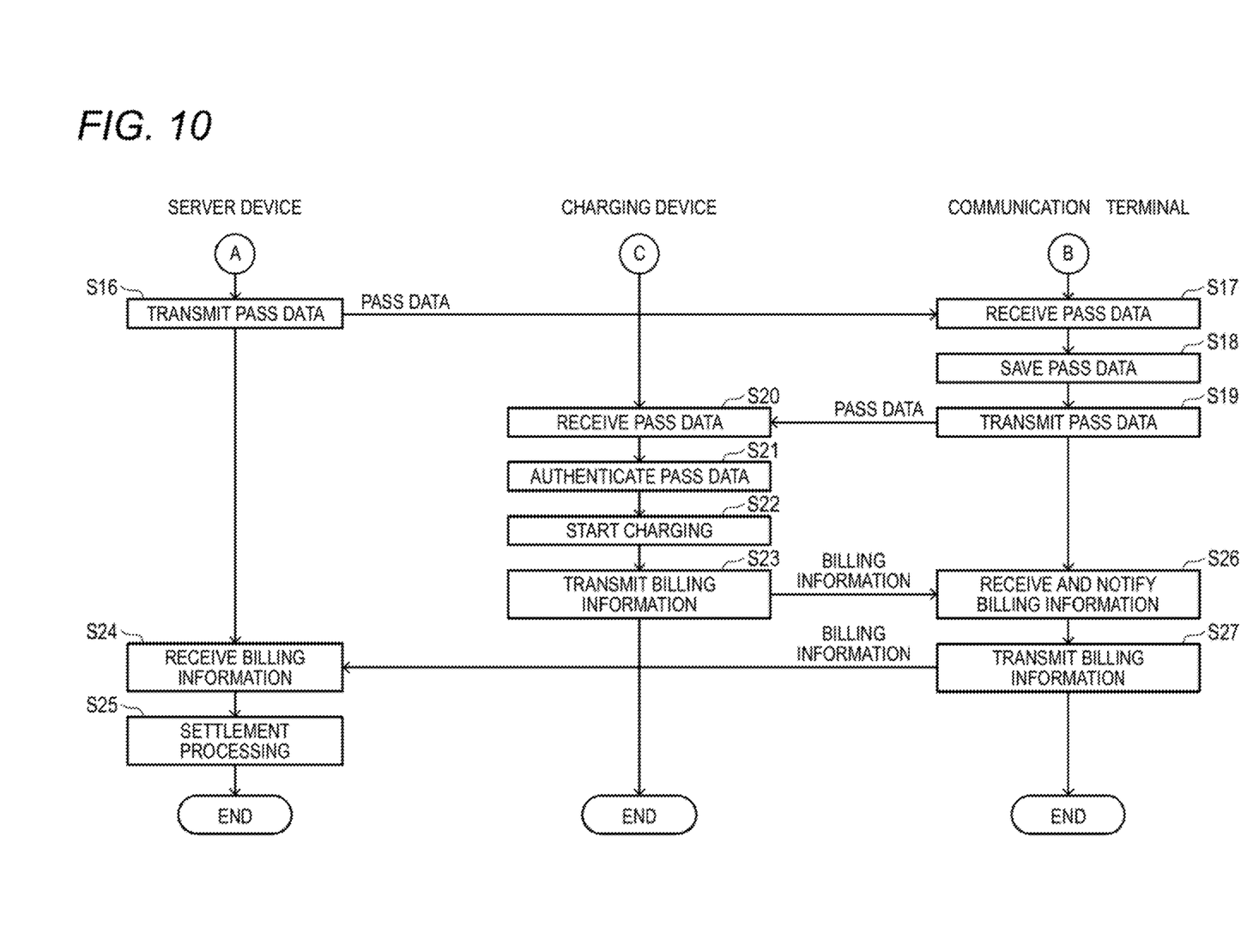
FIG. 10 is a communication sequence diagram showing a continuation of FIG. 4 in another embodiment.
Figure 11:
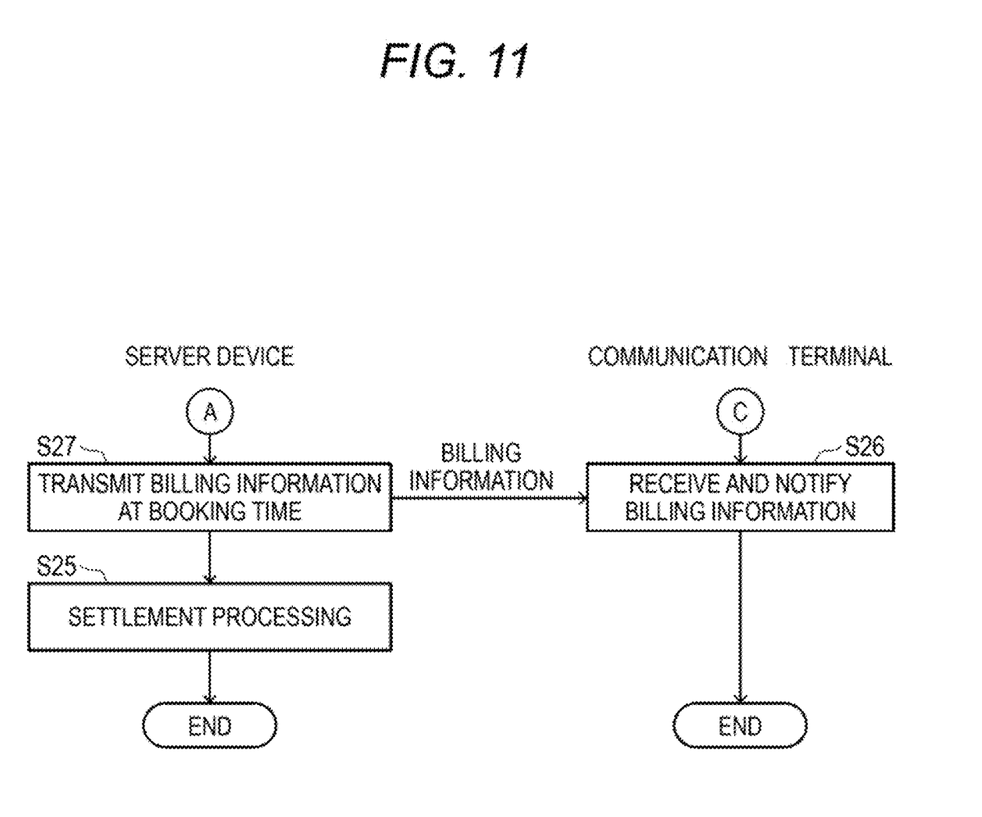
FIG. 11 is a communication sequence diagram showing a continuation of FIG. 4 in another embodiment.

Further, according to the embodiment described above, the charging device 2 is provided so as to be connectable to the Internet communication network 7, and as illustrated in FIG. 5, the charging device 2 transmits the billing information to the server device 4, but the charging device 2 is not limited to this. The charging device 2 is not necessarily able to be connected to the Internet communication network 7. As long as the charging device 2 can communicate with the communication terminal 3 in a non-contact manner, for example, as illustrated in FIG. 10, when the communication terminal 3 receives the billing information from the charging device 2 (S26), the received billing information may be transmitted to the server device 4. In FIG. 10, the same operations as those illustrated in FIG. 5 are designated by the same reference letters and numerals and detailed description thereof will be omitted.

Further, according to the embodiment described above, the charging device 2 is provided so as to be able to communicate with the communication terminal 3, and as illustrated in FIGS. 5 and 10, the charging device 2 transmits the billing information to the communication terminal 3 and the server device 4, but the charging device 2 is not limited to this. The charging device 2 is not necessary be able to be connected to the Internet communication network 7 or to communicate with the communication terminal 3.

In this case, when the booking time comes, the user goes to the location where the booked charging device 2 is installed and performs charging. Then, after the booking is confirmed (S15 in FIG. 4), the server device 4 transmits the billing information at the booking time (S27) and executes a billing process (S25), as illustrated in FIG. 10. When the communication terminal 3 receives the billing information, the communication terminal 3 notifies the user 5 of the billing information (S26) and ends the process. That is, the user is charged even when the user does not go to the booked charging device 2 unless a cancel process is carried out with respect to the server device 4.

According to the embodiment described above, the pass data that is registered in advance as registration information in the DB 42 is used, but the pass data is not limited to this. As long as the charging device 2 can be connected to the Internet communication network 7, for example, a well-known one-time pass authentication technique may be used to use disposable pass data which is valid only once at the booking date and time. That is, the server device 4 generates pass data for each booking and transmits the pass data and the booking date and time to the communication terminal 3 and the charging device 2. When the booking date and time come, the charging device 2 performs authentication with the pass data corresponding to the booking date and time transmitted from the server device 4.

Here, the features of the above-described embodiments of the charging device searching system, the communication terminal, and the server device according to the invention are briefly summarized in [1] to [5] below.

[1] A charging device searching system (1) is configured to search for a standard charging device (2) configured to perform a standard charging for a battery mounted on an electrically driven vehicle (6), the charging device searching system including a point of destination inputting unit (33) into which a point of destination is to be input and a searching unit (43) configured to set an area around the point of destination input by the point of destination inputting unit (33) as a search area and to search for the standard charging device (2) in the set search area.

[2] The charging device searching system (1) according to [1] includes a booking inputting unit (33) into which a booking request, a usage start time and a usage end time of the standard charging device (2) searched by the searching unit (43) are input and a booking unit (43) configured to book the standard charging device (2) for which the booking request has been input, for a time period between the usage start time and the usage end time.

[3] In the charging device searching system to according to [1] or [2], the searching unit (43) is configured, when a point of destination input by the point of destination inputting unit (33) is within a predetermined area, to set a surrounding area of a transfer point at which a mode of transportation is switched from the electrically driven vehicle to another transportation to reach the point of destination as the search area and to search for the standard charging device (2) in the set search area.

[4] A communication terminal (3) is configured to search for a standard charging device configured to perform a standard charging of a battery mounted on an electrically driven vehicle (6), the communication terminal including a point of destination inputting unit (33) into which a point of destination is to be input, a point of destination transmission unit (31) configured to transmit the point of destination input by the point of destination inputting unit (33) to a server device (4) and a search result receiving unit (31) configured to receive a search result of the standard charging device (2) around the point of destination from the server device (4).

[5] A server device (4) is configured to search for a standard charging device (2) configured to perform a standard charging for a battery mounted on an electrically driven vehicle (6), the server device including a point of destination receiving unit (41) configured to receive an information on a point of destination from a communication terminal (3), a searching unit (43) configured to: set an area around the point of destination for which the information has been received by the point of destination receiving unit (41) as a search area; and to search for the standard charging device in the set search area and a search result transmitting unit (41) configured to transmit a search result searched by the searching unit (43) to the communication terminal (3).

Although the invention is described in detail and with reference to specific embodiments, it will be apparent to those skilled in the art that various changes and modifications can be made without departing from the spirit and scope of the invention.

According to the invention, since a standard charging device around the point of destination is searched, it is possible to perform charging while the user enjoys sightseeing, eating, shopping, or the like at the point of destination. This makes it possible to provide a charging device searching system suitable for searching for a charging device which performs standard charging. Inventions which produce this effect are useful with respect to the charging device searching system.

What is claimed is:

1. A charging device searching system configured to search for a standard charging device configured to perform a standard charging for a battery mounted on an electrically driven vehicle, comprising:
    a point of destination inputting unit configured to input an information indicative of a point of destination; and
    a searching unit configured to: set an area around the point of destination for which the information has been input by the point of destination inputting unit as a search area; and to search for the standard charging device in the set search area,
    wherein the searching unit is configured:
    determine whether the point of destination is within a predetermined area;
    based on a determination that the point of destination is within the predetermined area, determine a transfer point at which a mode of transportation is switched from the electrically driven vehicle to another transportation to reach the point of destination, set a surrounding area of the transfer point as the search area, and search for the standard charging device in the set search area; and
    based on a determination that the point of destination is not within the predetermined area, set a surrounding area of the point of destination as the search area, and search for the standing charging device in the set search area.

2. The charging device searching system according to claim 1, comprising:
    a booking inputting unit configured to input a booking request, a usage start time and a usage end time of the standard charging device searched by the searching unit; and
    a booking unit configured to book the standard charging device for which the booking request has been input, for a time period between the usage start time and the usage end time.

3. A server device configured to search for a standard charging device configured to perform a standard charging for a battery mounted on an electrically driven vehicle, comprising:
    a point of destination receiving unit configured to receive an information indicative of a point of destination from a communication terminal;
    a searching unit configured to: set an area around the point of destination for which the information has been received by the point of destination receiving unit as a search area; and to search for the standard charging device in the set search area; and
    a search result transmitting unit configured to transmit a search result searched by the searching unit to the communication terminal
    wherein the searching unit is configured to:
    determine whether the point of destination is within a predetermined area;
    based on a determination that the point of destination is within the predetermined area, determine a transfer point at which a mode of transportation is switched from the electrically driven vehicle to another transportation to reach the point of destination, set a surrounding area of the transfer point as the search area, and search for the standard charging device in the set search area; and
    based on a determination that the point of destination is not within the predetermined area, set a surrounding area of the point of destination as the search area, and search for the standing charging device in the set search area.

4. The charging device searching system according to claim 1, wherein
    the predetermined area is an area registered in advance in a server device as an area in which a transportation system is developed and few private cars run.

5. The charging device searching system according to claim 4, wherein
    the searching unit includes a selecting unit configured to allow a user to select whether or not to set an area around a route connecting a departure point and the point of destination as the search area,
    when the user selects to set the area around the route as the search area, the searching unit sets the area around the route as the search area and searches for the standard charging device in the set search area.

* * * * *